US009614232B2

(12) United States Patent
Devries

(10) Patent No.: US 9,614,232 B2
(45) Date of Patent: Apr. 4, 2017

(54) MODULAR UNIT FUEL CELL ASSEMBLY

(75) Inventor: Peter David Devries, Spokane, WA (US)

(73) Assignee: ALTERGY SYSTEMS, Folsom, CA (US)

( * ) Notice: Subject to any disclaimer, the term of this patent is extended or adjusted under 35 U.S.C. 154(b) by 296 days.

(21) Appl. No.: 11/966,887

(22) Filed: Dec. 28, 2007

(65) Prior Publication Data

US 2009/0169939 A1 Jul. 2, 2009

(51) Int. Cl.
*H01M 8/0267* (2016.01)
*H01M 8/247* (2016.01)
*H01M 4/86* (2006.01)
*H01M 8/1018* (2016.01)

(52) U.S. Cl.
CPC ....... *H01M 8/0267* (2013.01); *H01M 4/8605* (2013.01); *H01M 8/247* (2013.01); *H01M 2008/1095* (2013.01); *Y02E 60/50* (2013.01)

(58) Field of Classification Search
CPC .. H01M 8/0267; H01M 8/247; H01M 4/8605; H01M 2008/1095; Y02E 60/50
USPC ........................................... 429/26, 437–438
See application file for complete search history.

(56) References Cited

U.S. PATENT DOCUMENTS

| 5,578,388 | A | 11/1996 | Faita et al. |
| 6,808,834 | B2 | 10/2004 | Koschany |
| 2004/0018407 | A1 | 1/2004 | Barbir |
| 2004/0086775 | A1* | 5/2004 | Lloyd et al. ................... 429/44 |
| 2004/0157108 | A1* | 8/2004 | Blunk et al. .................. 429/42 |
| 2005/0106446 | A1 | 5/2005 | Sato et al. |
| 2005/0244689 | A1 | 11/2005 | Horiguchi |
| 2006/0240308 | A1* | 10/2006 | Formanski et al. ........... 429/38 |
| 2006/0263667 | A1 | 11/2006 | Toro |
| 2008/0280178 | A1 | 11/2008 | Spink et al. |

FOREIGN PATENT DOCUMENTS

| CN | 1324500 A | 11/2001 |
| CN | 1691369 A | 4/2005 |
| EP | 0408104 A1 | 1/1991 |
| GB | 2 336 937 A | 11/1999 |
| GB | 2336937 A | 11/1999 |
| JP | 61279068 A | 12/1986 |
| WO | 99/27599 A1 | 6/1999 |
| WO | 99/57781 A1 | 11/1999 |
| WO | 00/26975 A1 | 5/2000 |

(Continued)

OTHER PUBLICATIONS

Mexican Patent Office, related patent application No. MX/a/2010/007056, Office Action issued May 27, 2012 (pp. 1-2), with claims (pp. 3-5), counterpart to PCT/US2008/088231, claiming priority to U.S. Appl. No. 11/966,887, pp. 1-5.

(Continued)

*Primary Examiner* — Stephen Yanchuk
(74) *Attorney, Agent, or Firm* — John P. O'Banion

(57) ABSTRACT

A modular unit fuel cell is disclosed, which comprises a membrane electrode assembly (MEA), an anode current collector/porous transport layer (PTL), a bipolar separator plate (BSP), a corrugated or finned spring cooling and transport structure, a cathode current collector/PTL and an anode frame. In this embodiment, air is passed through the finned spring cooling and transport structure and the air acts as both the cathode reactant and as a coolant.

15 Claims, 10 Drawing Sheets

(56) References Cited

FOREIGN PATENT DOCUMENTS

WO    WO 2005-086271    * 11/2005

OTHER PUBLICATIONS

State Intellectual Property Office of the P.R.C., First Office Action issued on Aug. 2, 2012 for Patent Application No. 200880123015, Chinese counterpart to PCT/US2008/088231, English translation of Office Action (pp. 1-8), Claims examined (pp. 9-11) and Original Office Action (pp. 12-22) pp. 1-22.
State Intellectual Property Office of the People's Republic of China, English translation summary of the Office Action issued on Apr. 24, 2013 for corresponding Chinese Patent Application No. 200880123015.X, (International Patent Application No. PCT/US2008/088231) (pp. 1-2) with claims pending (pp. 3-4) and original Office Action in Chinese (pp. 5-13) pp. 1-13.
European Patent Office, European Supplementary Search Report issued on Apr. 12, 2013 (pp. 1-7) for corresponding European Patent Application No. 08868973 (International Patent Application No. PCT/US2008/088231) with claims searched (pp. 8-9) pp. 1-9.
European Patent Office, First Office Action issued on Feb. 14, 2014, in corresponding European Patent Application No. 08 868 973.2 (pp. 1-6) with claims examined (pp. 7-8) pp. 1-8 Please note that all references cited in this office action were submitted with the Extended Supplementary Search Report on Jul. 11, 2013 and are not being submitted herewith.
European Patent Office (EPO), Office Action issued on Jun. 15, 2015, related EP Patent Application No. 08868973.2, pp. 1-6, with claims examined, p. 7-8. D1 and D2 cited therein were disclosed and submitted in an Information Disclosure Statement filed on Jul. 11, 2013.

* cited by examiner

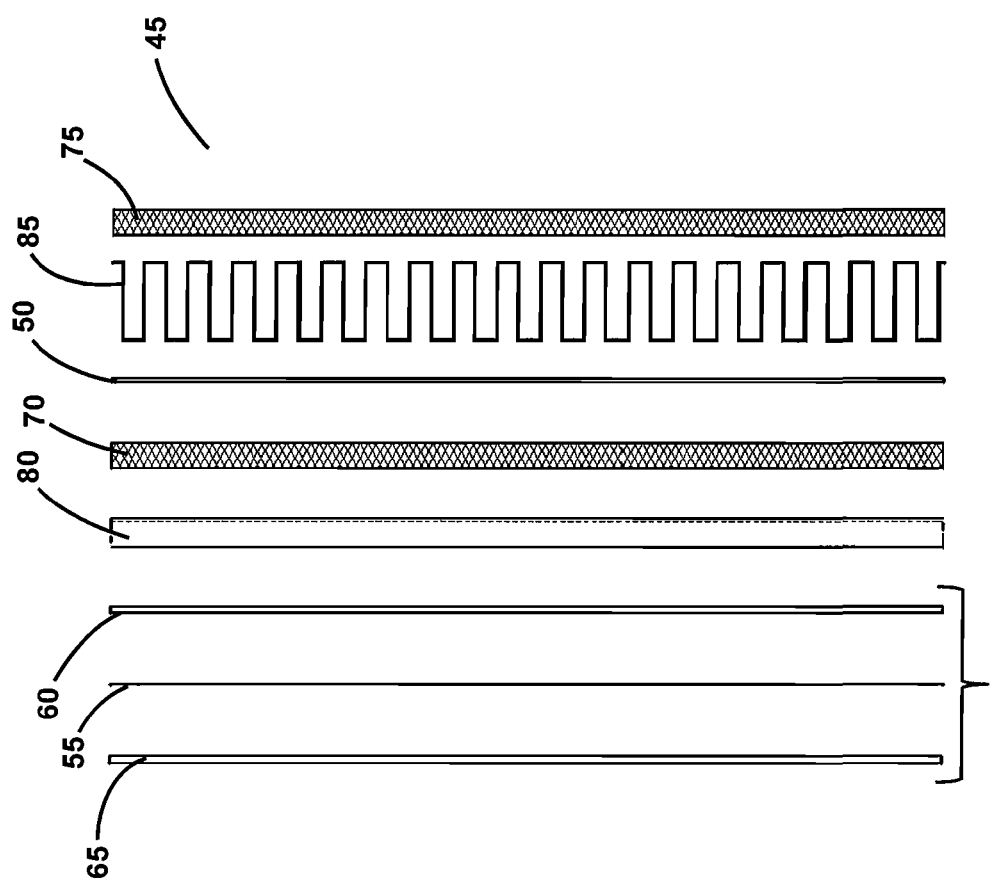

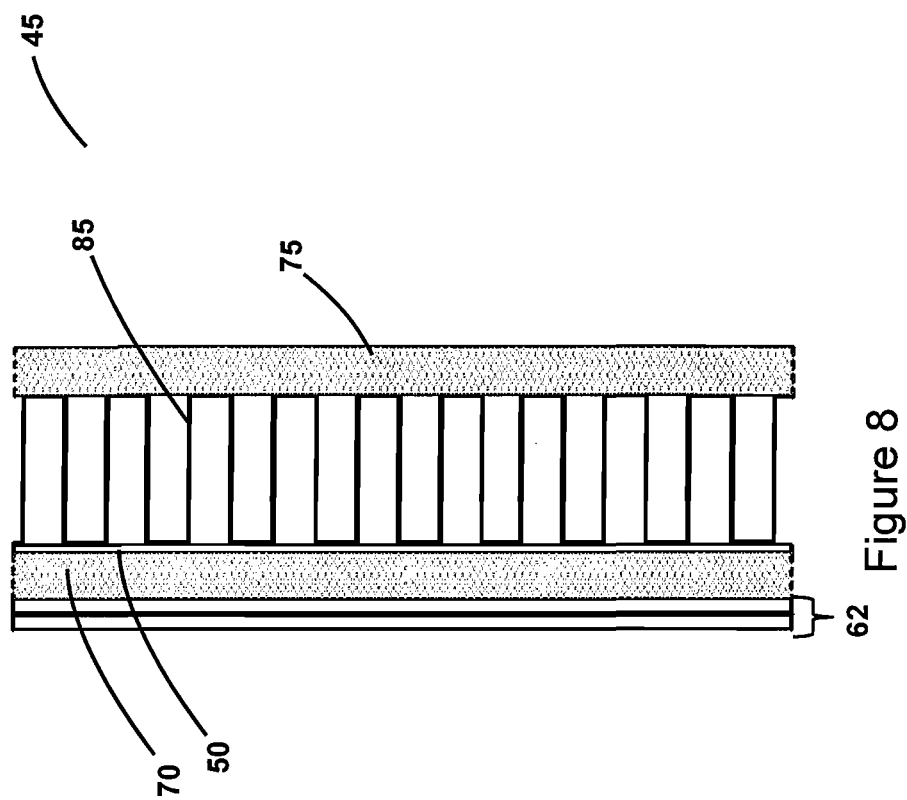

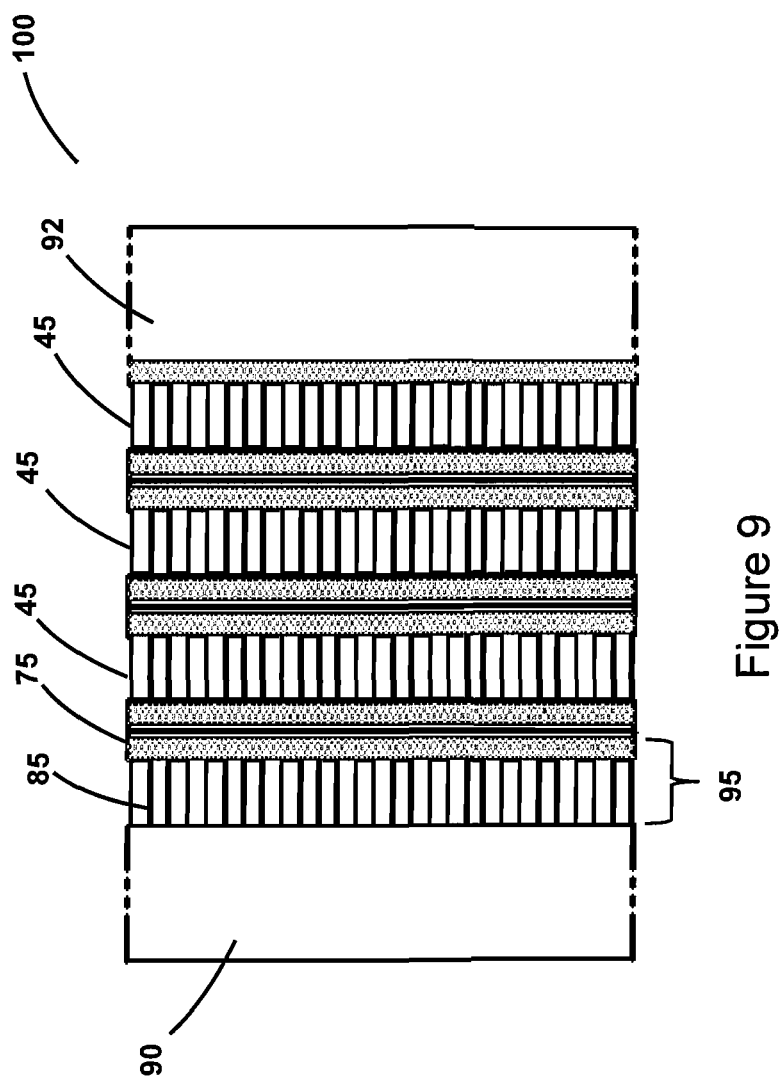

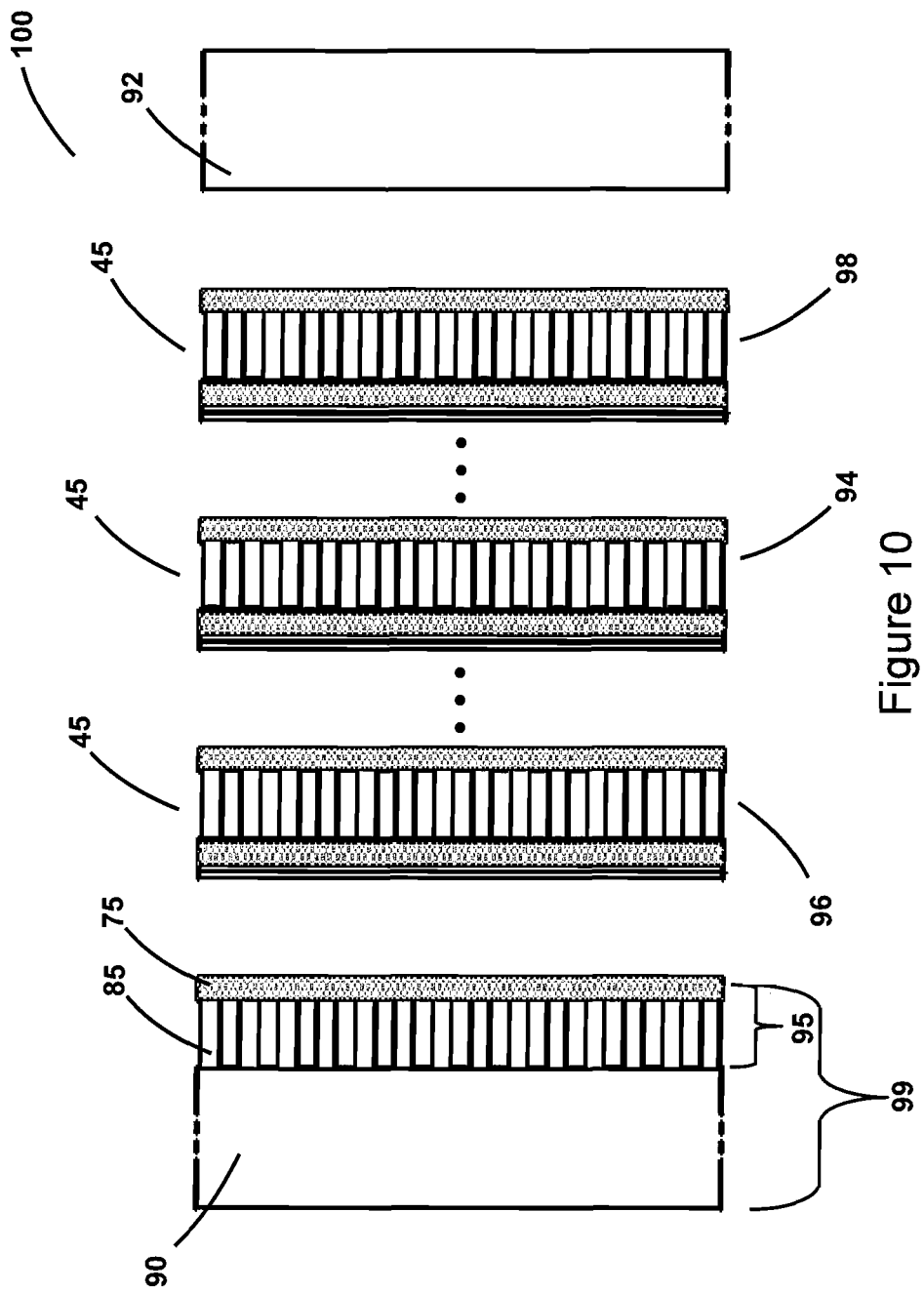

MODULAR UNIT FUEL CELL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention relates to polymer electrolyte membrane (PEM) fuel cells and methods for producing components thereof. More particularly, this invention relates to the design and construction of modular unit fuel cells that lower production costs.

2. Description of Related Art

A polymer electrolyte membrane (PEM) fuel cell is an electrochemical device comprising an anode electrode, a cathode electrode and an electrolyte in the form of a thin polymer membrane disposed between the anode electrode and the cathode electrode. Individual polymer electrolyte membrane fuel cells or fuel cell units are stacked with bipolar separator plates separating the anode electrode of one fuel cell unit from the cathode electrode of an adjacent fuel cell unit to produce polymer electrolyte membrane fuel cell stacks.

Electrochemical cells comprising polymer electrolyte membranes may be operated as fuel cells wherein a fuel and an oxidizer are electrochemically converted at the cell electrodes to produce electrical power, or as electrolyzers wherein an external electrical current is passed between the cell electrodes, typically through water, resulting in generation of hydrogen and oxygen at the respective electrodes of the cells. Fuel cells are energy conversion devices that use hydrogen and oxygen, usually from the air, to create electricity through a chemical conversion process, without combustion and without harmful emissions. The voltage and current output depends on the number of cells in the stack, total active surface area and efficiency. The basic process, for a single cell, is shown in FIG. 1.

Traditional fuel cell stacks 10, see FIGS. 2, 3 and 4 are made of many individual cells 20 which are stacked together. Such fuel cells typically have a bipolar separator plate (BSP) 12 made of machined graphite, a membrane electrode assembly (MEA) 14, gaskets 16, 18, a fuel manifold 24, and may have oxidizer and a coolant manifolds. See FIGS. 3 and 4.

For the proper operation of fuel cells, the hydrogen gas must be sealed inside the cell and separated from the gaseous oxidant (air or oxygen). In some fuel cells, cooling is required because of the heat generated during normal operation. This heat is commonly removed from the fuel cell stacks by liquid cooling, commonly using water as a coolant.

Additionally, it is critical that the BSP 12 be in intimate, continuous electrical contact with the MEA 14.

As shown in FIGS. 2 & 4, fuel cell stacks have typically used a "filter-press" structure, where thick and heavy "end plates" 32, 34 are placed at the ends of each fuel cell stack 10 and are held together by heavy tie-rods, or bolts 38 and nuts 40, or other fasteners.

The "filter press" structure is an attempt to serve two purposes: (i) sealing the hydrogen, the oxidant, and the liquid coolant, if used; and (ii) maintaining intimate electrical contact between the BSPs 12 and the MEAs 14, see FIGS. 2 and 4. Disassembly and analysis of fuel cell stacks built by traditional methods reveals that the "filter press" arrangement performs neither function very well. Such analysis has revealed evidence of incomplete electrical contact between BSPs 12 and MEAs 14, resulting in poor electrical conduction and lower cell performance. The analysis has also shown evidence of gas and liquid leakage.

BRIEF SUMMARY OF THE INVENTION

An aspect of the invention is a PEM modular unit fuel cell assembly, comprising: a membrane electrode assembly (MEA) having an anode side and a cathode side; an anode porous transport layer (PTL) having a first and second side, comprising a three-dimensional open structure suitable for gas diffusion as well as electrical and heat conduction, the first side of anode PTL is juxtaposed with and in electrical contact with the anode side of the MEA; a conductive bipolar separator plate having a first side and a second side, the first side of the conductive separator plate juxtaposed and in electrical contact with the second side of the anode gas flow field; a spring fin heat transfer structure having a first side and a second side, the first side of the heat transfer structure juxtaposed to the second side of the conductive separator plate; and a cathode PTL having a first and second side, comprising a three-dimensional open structure suitable for gas diffusion as well as electrical and heat conduction, the first side of cathode PTL is juxtaposed with and in electrical contact with the second side of the spring fin heat transfer structure.

Another aspect of the invention is a PEM modular unit fuel cell assembly, comprising: a membrane electrode assembly (MEA) having an anode side and a cathode side; an anode porous transport layer (PTL) having a first and second side, comprising a three-dimensional open structure suitable for gas diffusion as well as electrical and heat conduction, the first side of anode PTL is juxtaposed with and in electrical contact with the anode side of the MEA; a conductive bipolar separator plate having a first side and a second side, the first side of the conductive separator plate juxtaposed and in electrical contact with the second side of the anode gas flow field; a spring fin heat transfer structure having a first side and a second side, the first side of the heat transfer structure juxtaposed to the second side of the conductive separator plate; and a cathode PTL having a first and second side, comprising a three-dimensional open structure suitable for gas diffusion as well as electrical and heat conduction, the second side of cathode PTL is juxtaposed with and in electrical contact with the cathode side of the MEA.

A still further aspect of the invention is a fuel cell stack assembly, comprising: a first end plate and a second end plate, the second end plate being aligned with the first end plate; at least one modular unit fuel cell assemblies of claim 1 or claim 2 interposed between the first end plate and the second end plate; and a compression structure.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 7 shows an exploded cross-section of the elements of a modular unit cell of the present invention.

FIG. 8 shows a cross-section the elements of FIG. 7 assembled as a modular unit cell.

FIG. 9 shows a cross-section of the modular unit cells of FIG. 8 along with end-plates and termination structure arranged as a fuel cell stack.

FIG. 10 shows an exploded cross-section of the stack element of FIG. 9.

DETAILED DESCRIPTION OF THE INVENTION

Referring more specifically to the drawings, for illustrative purposes the present invention is embodied in the apparatus generally shown in FIG. 1 through FIG. 10. It will be appreciated that the apparatus may vary as to configuration and as to details of the parts, and that the method may vary as to the specific steps and sequence, without departing from the basic concepts as disclosed herein.

Figure 1:
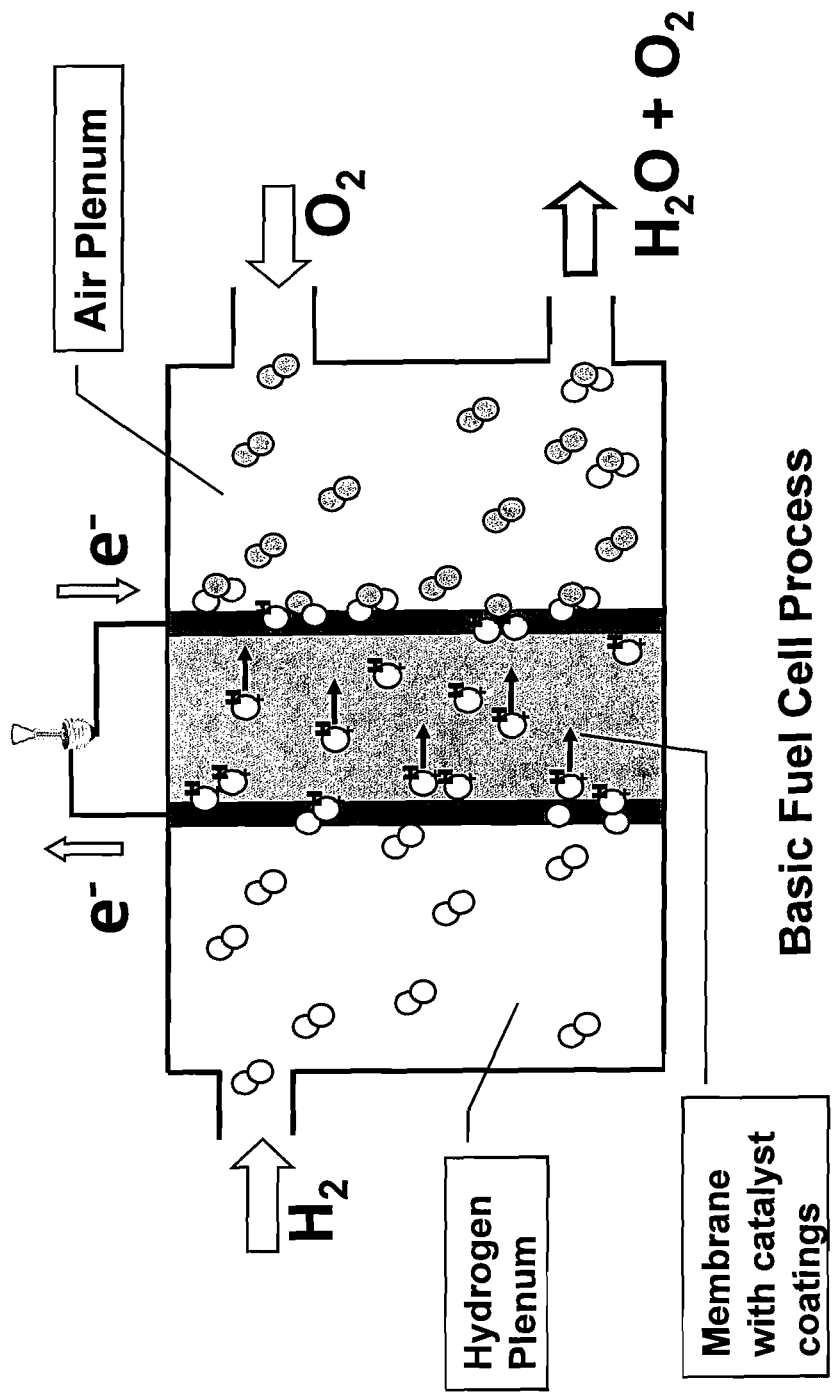
FIG. 1 is a prior art schematic representation of the basic conventional fuel cell process. It shows the extracted hydrogen ions that combine with oxygen across a PEM membrane to produce electrical power.
Figure 2:
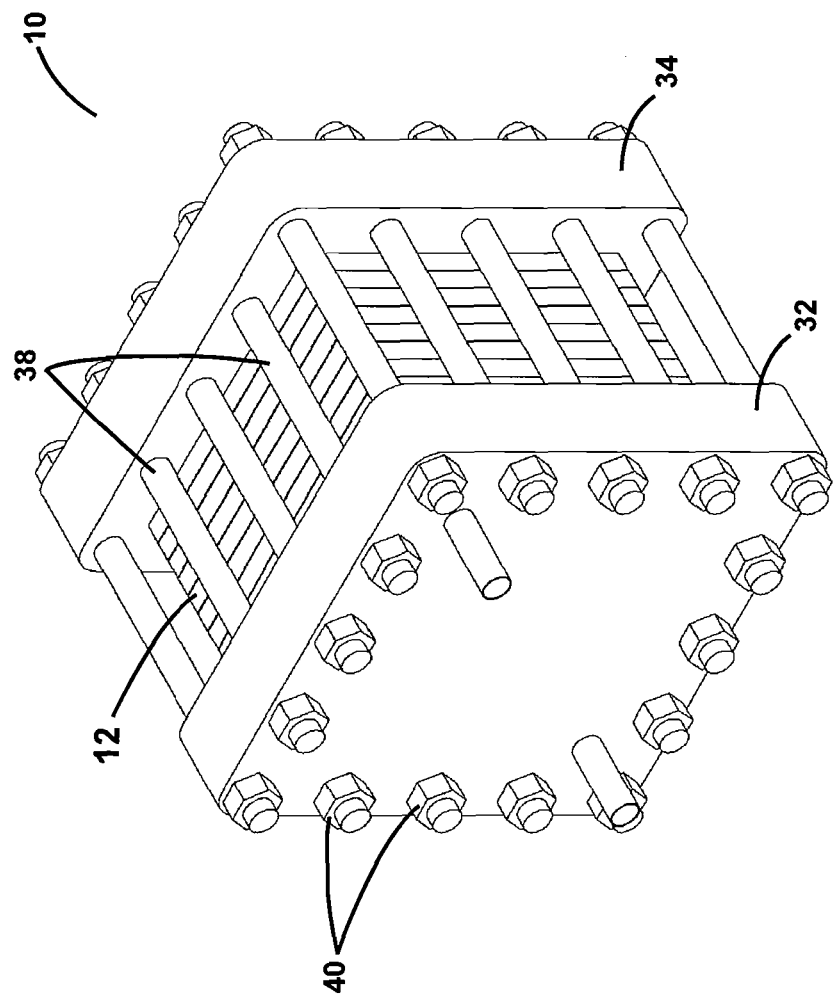
FIG. 2 shows a conventional prior art PEM fuel cell stack of electrodes compressed together with heavy end plates and tie rod bolts.
Figure 3:
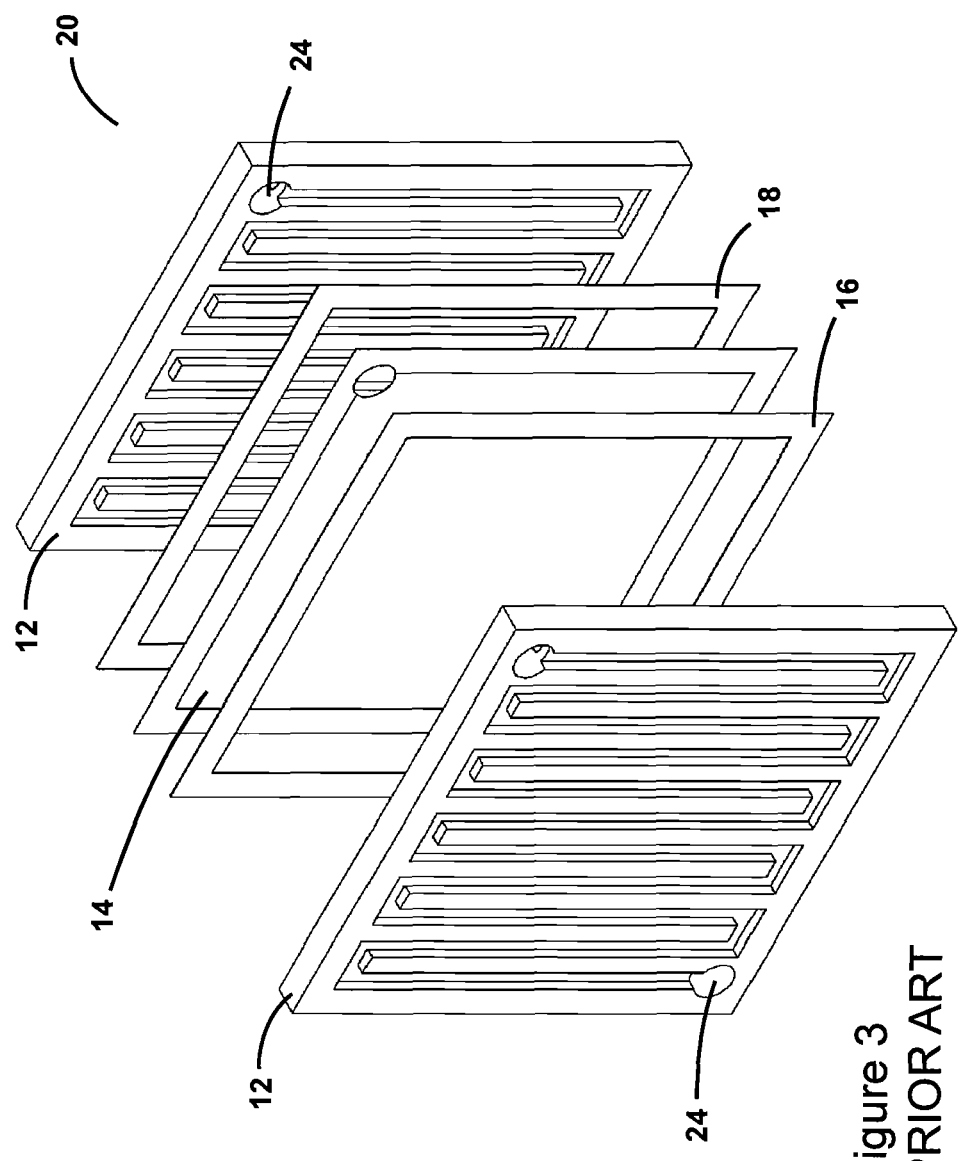
FIG. 3 is an exploded view of a conventional prior art PEM single cell of a fuel cell assembly.
Figure 4:
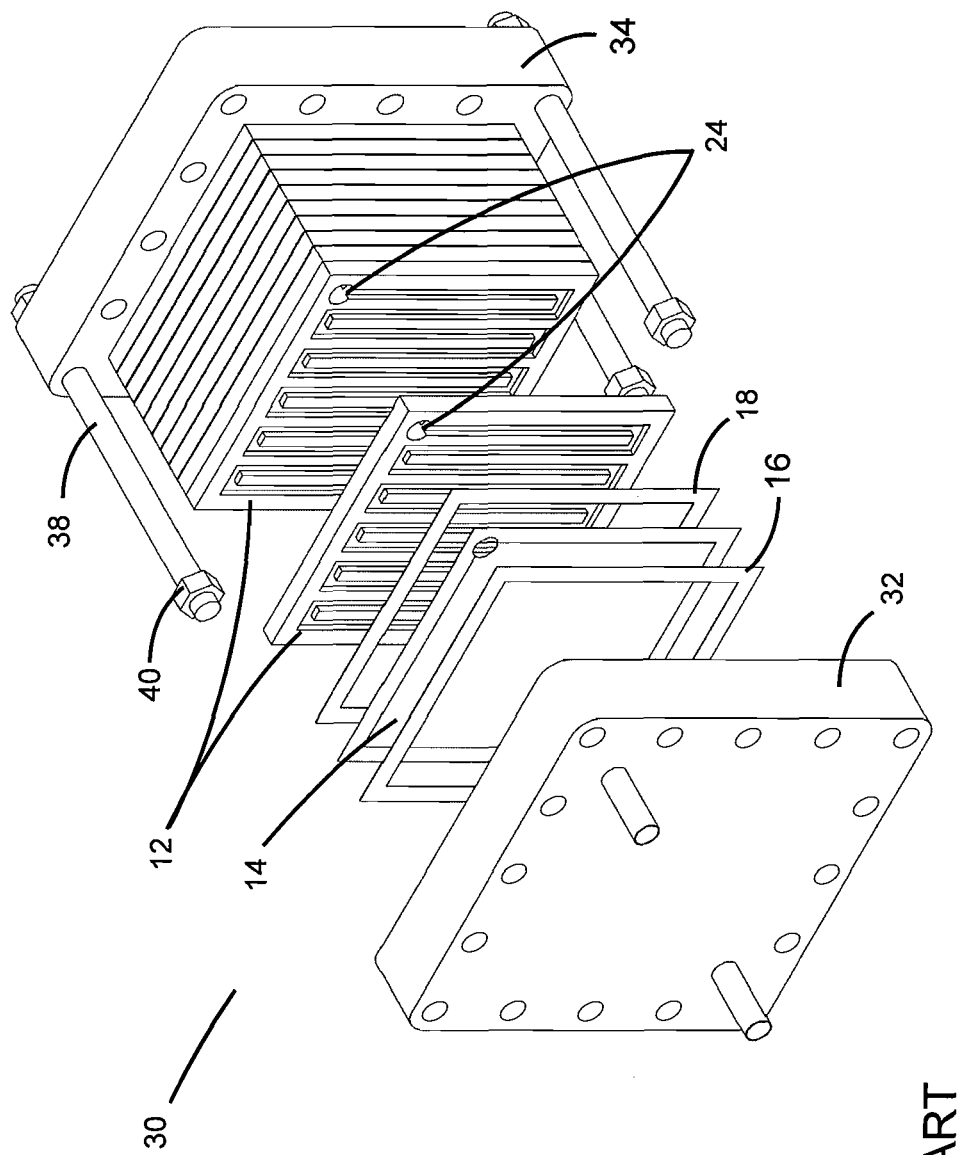
FIG. 4 is an exploded view of a conventional prior art PEM fuel cell stack of electrodes showing the arrangement of the internal and external parts.
Figure 5:
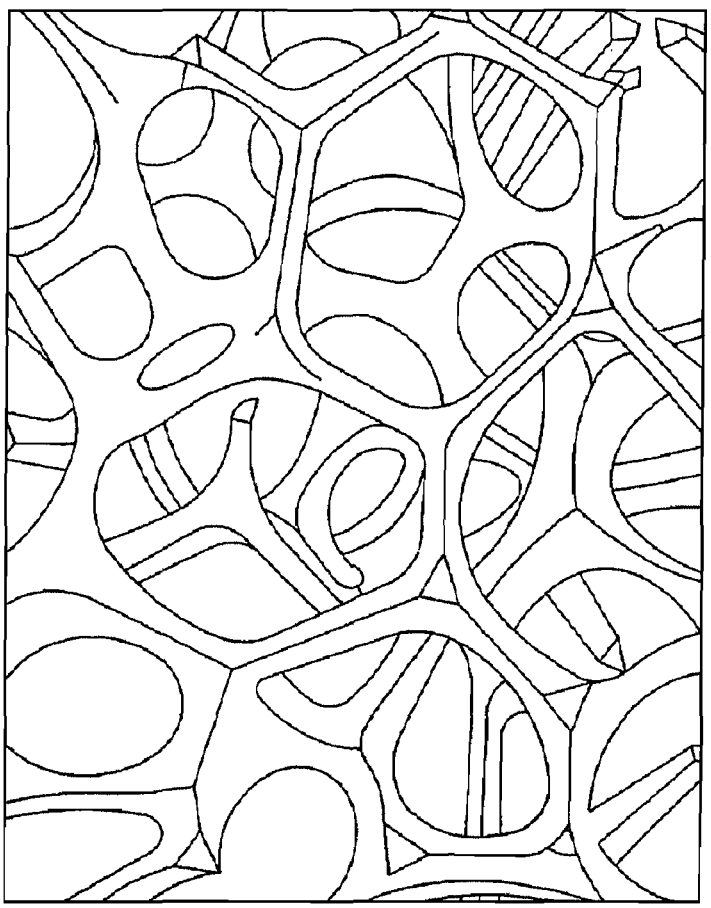
FIG. 5 is an enlarged depiction of an open three dimensional reticulated network structure or foam.
Figure 6:
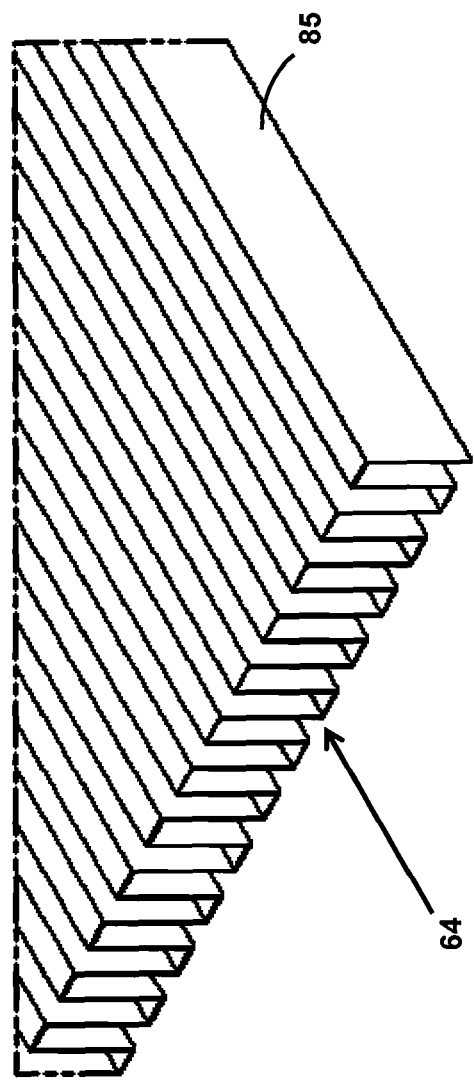
FIG. 6 is an enlarged representation of a corrugated or finned spring cooling and transport structure.

FIGS. 7 and 8 show the preferred embodiment of the modular unit fuel cell 45 of the invention. The exploded view of FIG. 7 is shown for clarity. The modular unit fuel cell 45 is comprised of: a membrane electrode assembly (MEA) 62 having an anode side that is juxtaposed and in electrical contact with an anode current collector/porous transport layer (PTL) 70, which is juxtaposed and in electrical contact with a bipolar separator plate (BSP) 50, which is juxtaposed and in electrical contact with a corrugated or finned spring cooling and transport structure (CTS) 85, which is juxtaposed with a cathode current collector/porous transport layer 75 and an anode frame 80 (not shown in FIG. 8 for clarity). In all embodiments air is passed through the finned spring cooling and transport structure 85 normal to the view and as is shown in FIG. 6 by the direction arrow 64 and said air acts as both the cathode reactant and as a coolant.

In a first alternate embodiment (not shown) of the modular unit fuel cell, the cathode PTL 75, rather than being juxtaposed and in electrical contact with the finned spring cooling and transport structure 85, it is juxtaposed and in electrical contact with the cathode side of the MEA 62, which is juxtaposed and in electrical contact with an anode PTL 70, which is juxtaposed and in electrical contact with BSP 50, which is juxtaposed and in electrical contact with the CTS 85.

In a second alternate embodiment (not shown), the CTS 85, rather than being juxtaposed and in electrical contact with the BSP 50, it is juxtaposed and electrical contact with a first side of the cathode PTL 75, the cathode PTL 75 has a second side which is juxtaposed and in electrical contact with the cathode side of the MEA 62 which is juxtaposed and in electrical contact with an anode PTL 70, which is juxtaposed and in electrical contact with BSP 50. All embodiments result in a modular unit fuel cell which can be assembled prior to being further assembled into a fuel cell stack 100, FIGS. 9 and 10.

The MEA 62, FIGS. 7 and 8, which can be constructed in several ways known by those familiar with the art, consists of a proton exchange membrane (PEM) 55, an anode gas diffusion (GDL) layer 60 and a cathode gas diffusion layer 65 as well as an anode electrode (not shown) and a cathode electrode (not shown). The assembled MEA may or may not have a border around the perimeter which may or may not be reinforced. A MEA is typically constructed in one of two methods known to those familiar with the art.

The first method is the catalyst coated membrane (CCM) approach in which a catalyzed anode electrode is applied to a first side of the PEM 55 and a catalyzed cathode electrode is applied to the second side of the PEM 55, anode and cathode GDLs 60, 65 are then applied to the respective sides of the CCM forming the MEA 62.

The second method of MEA construction is the gas diffusion electrode (GDE) approach in which a catalyzed anode electrode is applied to a first side of the anode GDL 60 forming an anode GDE and a catalyzed cathode electrode is applied to a first side of the cathode GDL 65 forming a cathode GDE. The catalyzed anode electrode side of the anode GDE is applied to a first side of a PEM 55 and the catalyzed cathode electrode side of the cathode GDE are applied to opposite sides of the PEM 55 forming the MEA 62.

In both the first and second approaches, the components may be pre-assembled before being assembled as an MEA 62 into the modular unit cell 45 of the present invention or they may be assembled into an MEA 62 during the assembly of the modular unit cell 45 of the present invention. MEAs and MEA components are available from a number of suppliers, e.g., 3M, DuPont, W. L. Gore, SGL Carbon, Ballard, Freudenberg, etc.

The BSP 50 is a thin sheet metal component which can be inexpensively produced by stamping, blanking, shearing and punching or other sheet metal working techniques known in the art. Bipolar plates can be made from a variety of metals and metal alloys such as stainless steel, titanium, nickel or alloys; advantageously and preferably due to cost considerations, a preferred material is 300 series stainless steel.

The anode current collector/porous transport layer (PTL) 70 and cathode current collector/porous transport layer 75 allow the transport of reactants to the catalyzed electrode. The removal of reaction products from the electrodes is instrumental in the transport of heat from the membrane. The PTLs are an electrical conductor and distribute the compressive stresses evenly when the modular unit fuel cell is compressed in a fuel cell stack. The PTLs can be a reticulated structure, also called foam, a woven mesh or cloth, a nonwoven felt or paper, sintered material, an expanded material or other porous structures. The PTL can be of aluminum, nickel or alloys, titanium or alloys, stainless steel, carbon or graphite, or other electrically conductive materials and can be supplied by ERG, SGL, Toray, INCO Special Products, RECEMAT and others. A preferred embodiment is the use of metal foam, FIG. 5, with a cell size of between 0.040 and 1.0 mm with a thickness of 0.1 to 3 mm. The PTLs may or may not be of the same material and be employed in various combinations. As a non-limiting example, the anode PTL may be of metal foam and the cathode PTL may be a paper or felt supported by a metal mesh or cloth.

The corrugated or finned spring cooling and transport structure 85 allows for the transport of cathode air, containing oxygen for the cathode reaction, for the removal of reaction products as well as being cooling structure to remove heat during fuel cell operation by the passing of reactant/coolant through and past the fins. It also provides a degree of spring compliance in the fuel cell stack when the cells are stacked and pressed together. In addition, the spring finned cooling structure 85, in a preferred embodiment, is constructed from 0.05 to 0.25 mm thick material which may be of aluminum, nickel, titanium or their alloys, or stainless steel (preferably 300 series). The height is on the order of 0.5 mm to 5 mm with a corrugation pitch of between 0.25 to 3 mm. A source for such a finned structure is Robinson Fin Machines, Inc.

The anode frame 80 contains the anode PTL and incorporates channels for feeding the hydrogen fuel to the electrochemically active area and channels for allowing the purging of the hydrogen fuel and the removal of excess condensed water that may be contained in the anode. Materials of choice for anode frame 80 include polymeric or elastomeric materials such as PVC, polycarbonate, ABS, silicone, urethane, etc.

The embodiment of FIG. 8 shows the modular unit fuel cell 45 of the invention as a complete assembly. In FIG. 8, the anode frame 80 is omitted for clarity. On assembling the metal components, i.e., the anode PTL 70, the BSP 50, the finned spring cooling and transport structure 85 and the cathode PTL can be assembled concurrently with the remainder of the modular unit fuel cell 45 or the metal structure can be pre-assembled as a complete unit by metallurgical means such as brazing or welding or by other means known to those schooled in the art.

The modular unit fuel cell 45 is subsequently assembled into a fuel cell stack 100, FIG. 9. An exploded view for the fuel cell stack 100 showing the components of the assembly is shown for clarity in FIG. 10. The fuel cell stack 100 is comprised of one or more modular unit fuel cells 45, two end plates, a cathode end plate 90 and an anode end plate 92, as well as a cathode termination structure 95. Of note are the cathode end cell 96, the anode end cell 98 and center stack cells 94. A stack can contain a single modular unit fuel cell 45 in which case the single cell serves both as the cathode end cell 96 and the anode end cell 98 with no center stack cells 94. A two cell stack contains a separate cathode end cell 96 and a separate anode end cell 98 but no center stack cells 94. A stack with greater than two cells contains a separate cathode end cell 96 and a separate anode end cell 98 and one or multiplicity center stack cells 94.

A cathode termination structure 95 is juxtaposed and in electrical contact with the cathode end plate 90 and the cathode end cell 96. The cathode termination structure 95 consists of a finned spring cooling and transport structure 85 and is juxtaposed and in electrical contact with a cathode current collector/porous transport layer 75. The cathode termination structure 95 can be assembled by metallurgical means such as brazing or welding or by other means known to those schooled in the art and may or may not be in metallurgical congress with the cathode end plate 90 to form complete end plate termination assembly 99.

In the first alternate embodiment of the modular unit fuel cell (not shown), the cathode termination structure 95 does not include the cathode PTL 75, only the finned spring cooling and transport structure 85 which is juxtaposed with the cathode end plate 90 and which may or may not be in metallurgical congress with the cathode end plate 90, the cathode PTL being incorporated with the alternate embodiment modular unit fuel cell.

In the first alternate embodiment modular unit fuel cell, a cathode PTL 75 maybe juxtaposed and in electrical contact with both the anode end plate 92 and the anode end cell 98, and may or may not be in metallurgical congress with both the anode end plate 92 and the anode end cell 98, or may be in metallurgical congress with either the first alternate embodiment modular unit fuel cell or the anode end plate 92 or neither.

In the second alternate embodiment of the modular unit fuel cell (not shown), the cathode termination structure 95 is not employed but rather an anode termination structure is used. A first side of a cooling and transport structure 85 is juxtaposed and in electrical contact with the BSP of the anode end cell 98 and a second side is also juxtaposed and in electrical contact with the anode end plate 92. This anode termination structure may or may not be in metallurgical congress with both the anode end plate 92 and the anode end cell 98, or may be in metallurgical congress with either the second alternate embodiment modular unit fuel cell or the anode end plate 92 or neither.

Upon assembly, the stack components are clamped together by means well known to those schooled in the art with a compressive stress generally in the range of 2.5 to 50 kg/cm$^2$. The anode end plate 92 and the cathode end plate 90 are electrically connected to an external electrical load.

While only a few embodiments of the invention have been shown and described herein, it will become apparent to those skilled in the art that various modifications and changes can be made in the fabrication of the modular unit fuel cell 45 and its subsequent incorporation into a fuel cell stack to make up a fully functioning fuel cell device without departing from the spirit and scope of the present invention. Furthermore, the dimensions, materials and processes recited herein are for purposes of illustration, and are not meant to exclude the use of other dimensions, materials or processes.

Although the description above contains many details, these should not be construed as limiting the scope of the invention but as merely providing illustrations of some of the presently preferred embodiments of this invention.

Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A PEM modular unit fuel cell assembly, comprising:
   a membrane electrode assembly (MEA) having an anode side and a cathode side;
   an anode porous transport layer (PTL) having a first and second side, comprising a three-dimensional open structure suitable for gas diffusion and electrical and heat conduction, the first side of anode PTL is juxtaposed with and in electrical contact with the anode side of the MEA;
   a conductive bipolar separator plate having a first side and a second side, the first side of the conductive separator plate juxtaposed and in electrical contact with the second side of the anode PTL;
   a heat transfer structure having a first side and a second side, the first side of the heat transfer structure juxtaposed with the second side of the conductive separator plate; and
   a cathode PTL having a first and second side, comprising a three-dimensional open structure suitable for gas diffusion and electrical and heat conduction, the first side of cathode PTL is juxtaposed with and in electrical contact with the second side of the heat transfer structure;
   wherein the MEA comprises a proton exchange membrane (PEM) disposed between an anode gas diffusion layer and a cathode gas diffusion layer;
   wherein the cathode PTL and anode PTL comprise a reticulated structure configured to distribute the compressive stresses evenly when the modular unit fuel cell is compressed in a fuel cell stack.

2. A PEM modular unit fuel cell assembly, comprising:
   a membrane electrode assembly (MEA) having an anode side and a cathode side;
   an anode porous transport layer (PTL) having a first and second side, comprising a three-dimensional open structure suitable for gas diffusion and electrical and heat conduction, the first side of anode PTL is juxtaposed with and in electrical contact with the anode side of the MEA;
   a conductive bipolar separator plate having a first side and a second side, the first side of the conductive separator plate juxtaposed and in electrical contact with the second side of the anode PTL;
   a heat transfer structure having a first side and a second side, the first side of the heat transfer structure juxtaposed with the second side of the conductive separator plate; and
   a cathode PTL having a first and second side, comprising a three-dimensional open structure suitable for gas diffusion and electrical and heat conduction, the second side of cathode PTL is juxtaposed with and in electrical contact with the cathode side of the MEA;
   wherein the MEA comprises a proton exchange membrane (PEM) disposed between an anode gas diffusion layer and a cathode gas diffusion layer;
   wherein the cathode PTL and anode PTL comprise a reticulated structure configured to distribute the compressive stresses evenly when the modular unit fuel cell is compressed in a fuel cell stack.

3. PEM modular unit fuel cell assembly, comprising:
   a membrane electrode assembly (MEA) having an anode side and a cathode side;
   an anode porous transport layer (PTL) having a first and second side, comprising a three-dimensional open structure suitable for gas diffusion and electrical and heat conduction, the first side of anode PTL is juxtaposed with and in electrical contact with the anode side of the MEA;
   a conductive bipolar separator plate having a first side and a second side, the first side of the conductive separator plate juxtaposed and in electrical contact with the second side of the anode PTL;
   a cathode PTL having a first and second side, comprising a three-dimensional open structure suitable for gas diffusion and electrical and heat conduction, the second side of cathode PTL is juxtaposed with and in electrical contact with the cathode side of the MEA; and
   a heat transfer structure having a first side and a second side, the first side of the heat transfer structure juxtaposed with the first side of the cathode PTL;
   wherein the MEA comprises a proton exchange membrane (PEM) disposed between an anode gas diffusion layer and a cathode gas diffusion layer;
   wherein the cathode PTL and anode PTL comprise a reticulated structure configured to distribute the compressive stresses evenly when the modular unit fuel cell is compressed in a fuel cell stack.

4. A fuel cell assembly as recited in claim 1, wherein the heat transfer structure comprises a plurality of undulations that extend away from the conductive separator plate when positioned adjacent the conductive separator plate, the plurality of undulations spaced to allow a fluid to pass through the undulations parallel to a planar surface of the conductive separator plate, said fluid acting as a coolant.

5. A fuel cell assembly as recited in claim 2, wherein the heat transfer structure comprises a plurality of undulations that extend away from the conductive separator plate when positioned adjacent the conductive separator plate, the plurality of undulations spaced to allow a fluid to pass through the undulations parallel to a planar surface of the conductive separator plate, said fluid acting as a coolant.

6. A fuel cell assembly as recited in claim 3, wherein the heat transfer structure comprises a plurality of undulations that extend away from the cathode PTL when positioned adjacent the cathode PTL, the plurality of undulations spaced to allow a fluid to pass through the undulations parallel to a planar surface of the cathode PTL, said fluid acting as a coolant.

7. A fuel cell assembly as recited in claim 1, wherein the anode PTL and cathode PTL have a higher porosity than the anode gas diffusion layer and a cathode gas diffusion layer.

8. A fuel cell assembly as recited in claim 2, wherein the anode PTL and cathode PTL have a higher porosity than the anode gas diffusion layer and a cathode gas diffusion layer.

9. A fuel cell assembly as recited in claim 3, wherein the anode PTL and cathode PTL have a higher porosity than the anode gas diffusion layer and a cathode gas diffusion layer.

10. A fuel cell assembly as recited in claim 7, wherein the anode PTL and cathode PTL have pores having a larger pore size than pores of the anode gas diffusion layer and a cathode gas diffusion layer.

11. A fuel cell assembly as recited in claim 8, wherein the anode PTL and cathode PTL have pores having a larger pore size than pores of the anode gas diffusion layer and a cathode gas diffusion layer.

12. A fuel cell assembly as recited in claim 9, wherein the anode PTL and cathode PTL have pores having a larger pore size than pores of the anode gas diffusion layer and a cathode gas diffusion layer.

13. A fuel cell assembly as recited in claim 7:
wherein the anode PTL and cathode PTL comprise structure configured to conductively deliver reactant and reactant product to and from the anode gas diffusion layer and a cathode gas diffusion layer; and
wherein the anode gas diffusion layer and a cathode gas diffusion layer proton exchange membrane comprise structure having high in-plane permeabilitly to promote diffusion of reactant and reactant product to and from the PEM.

14. A fuel cell assembly as recited in claim 8:
wherein the anode PTL and cathode PTL comprise structure configured to conductively deliver reactant and reactant product to and from the anode gas diffusion layer and a cathode gas diffusion layer; and
wherein the anode gas diffusion layer and a cathode gas diffusion layer proton exchange membrane comprise structure having high in-plane permeabilitly to promote diffusion of reactant and reactant product to and from the PEM.

15. A fuel cell assembly as recited in claim 9:
wherein the anode PTL and cathode PTL comprise structure configured to conductively deliver reactant and reactant product to and from the anode gas diffusion layer and a cathode gas diffusion layer; and
wherein the anode gas diffusion layer and a cathode gas diffusion layer proton exchange membrane comprise structure having high in-plane permeability.

* * * * *